April 15, 1947.  B. J. MILLEVILLE  2,419,188
CAR TRUCK
Filed Aug. 16, 1943  3 Sheets-Sheet 1
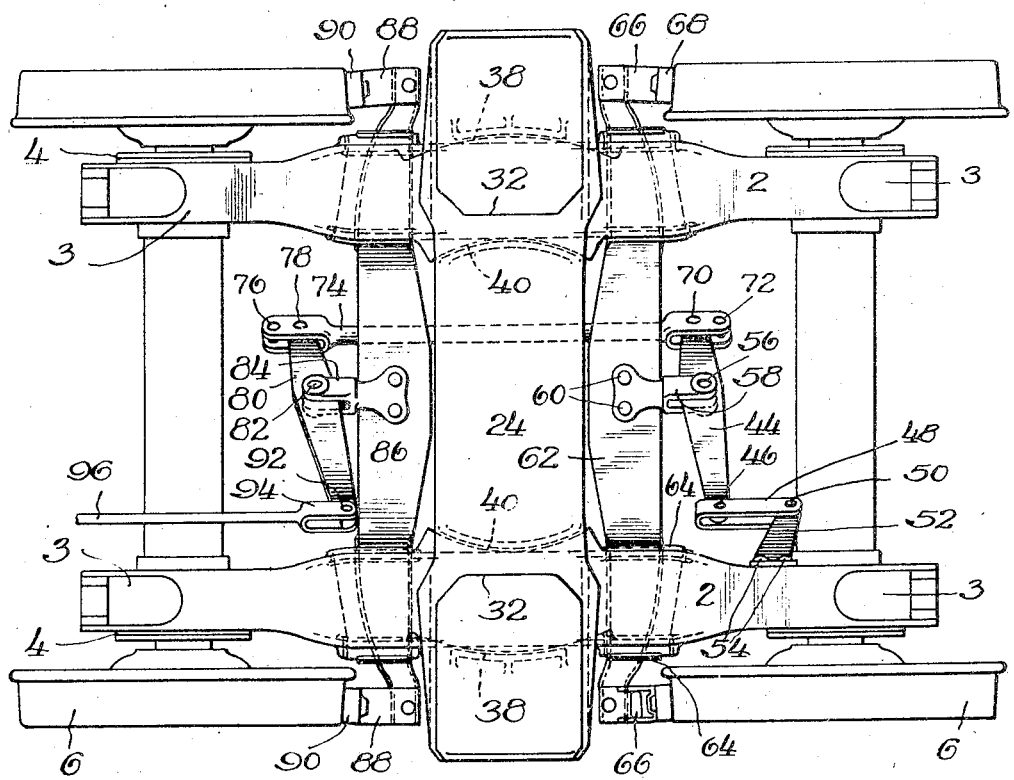
Fig. 1
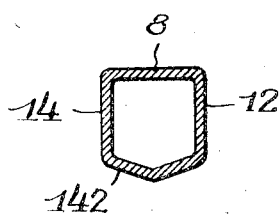
Fig. 7
Fig. 2
INVENTOR.
Bertram J. Milleville
BY
Atty.

April 15, 1947.　　　B. J. MILLEVILLE　　　2,419,188
CAR TRUCK
Filed Aug. 16, 1943　　　3 Sheets-Sheet 2

INVENTOR.
Bertram J. Milleville
BY
Atty.

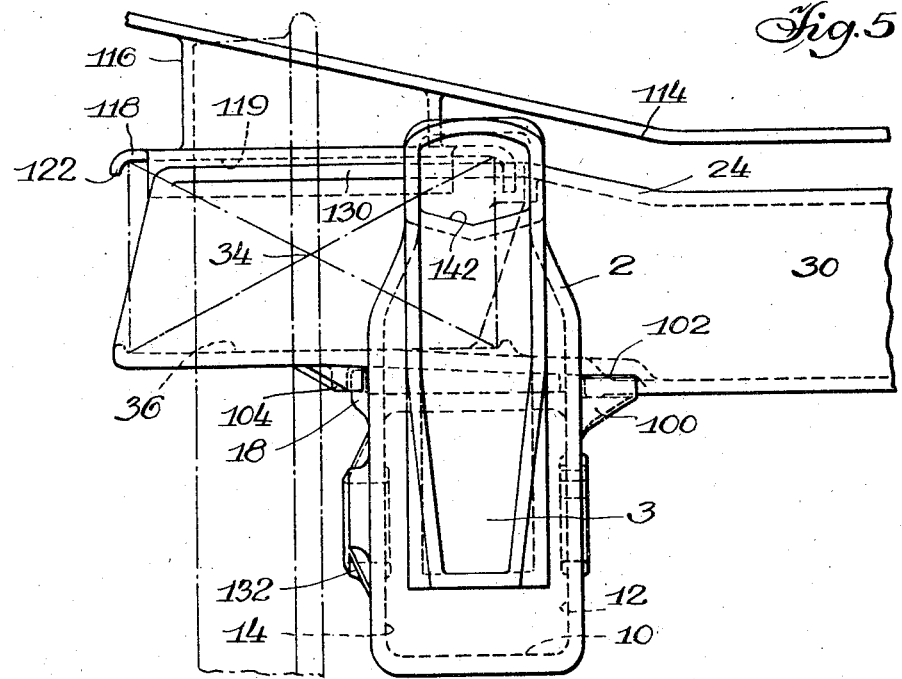
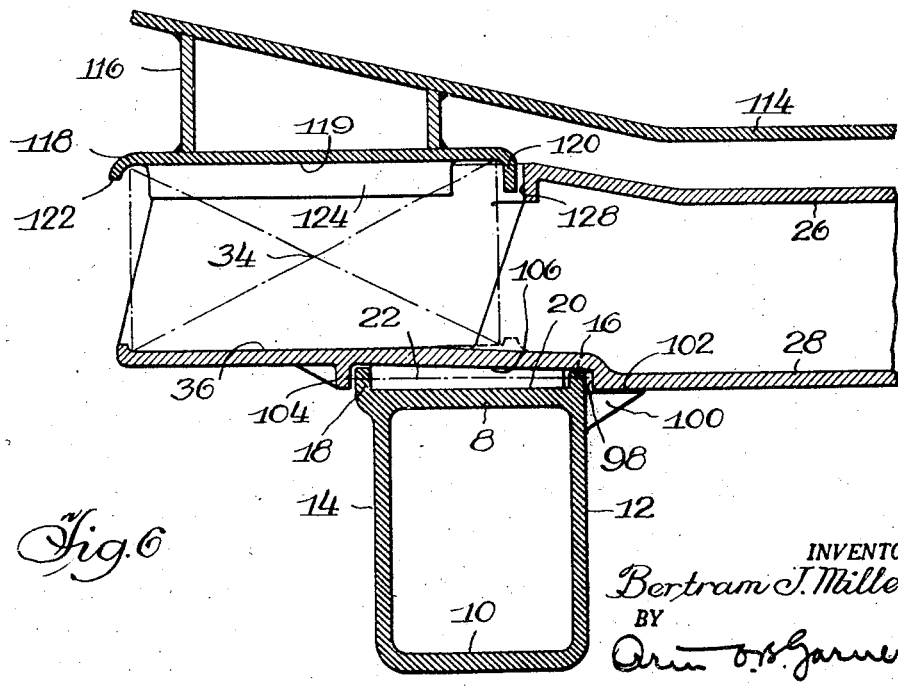

Patented Apr. 15, 1947

2,419,188

UNITED STATES PATENT OFFICE 2,419,188

CAR TRUCK

Bertram J. Milleville, Chicago, Ill., assignor to American Steel Foundries, Chicago, Ill., a corporation of New Jersey Application August 16, 1943, Serial No. 498,755

27 Claims. (Cl. 105—200)

My invention relates to a railway car truck and more particularly to a four wheel freight car truck of novel design.

The general object of my invention is to devise a railway freight car truck particularly adaptable for the use of roller bearing journal boxes.

A different object of my invention is to devise a four wheel freight car truck of roller bearing type suitable for connection to a supported car body without the ordinary king pin or center pin, but utilizing instead of such center pin the spring groups as thrust means between the car body and the truck with longitudinal and lateral motion stop means associated therewith.

A still further object of my invention is to devise such a railway car truck as that described and associate therewith suitable braking means therefor.

A different object of my invention is to devise a four wheel railway freight car truck wherein spaced side frames may support, through the medium of roller bearings, a bolster extending therebetween, and wherein said bolster may be provided with spring seats at opposite ends thereof for support of a car body superposed thereon, said car body being provided with side bearings especially adapted to support spring seats over said first-mentioned spring seats in order to receive therebetween a spring assembly.

My invention comprehends such an arrangement as that described wherein the side frame may be formed with inboard and outboard arcuate bearing surfaces against which complementary shoulders, formed on the bolster, may abut, said arrangement permitting a reasonable amount of rotative movement of the bolster with respect to the side frames and also accommodating such out-of-square relationship as is normally desirable when negotiating a curve.

I have illustrated my invention as applied to a four wheel freight car truck utilizing side frames having pedestal jaws as most adaptable for the application thereto of roller bearing journal boxes.

In the drawings,

Figure 1 is a top plan view of my novel form of railway car truck with braking means applied thereto.

Figure 2 is a fragmentary side elevation of the truck and brake arrangement shown in Figure 1.

Figure 5 is a fragmentary end elevation of my novel car truck, and Figure 6 is a fragmentary sectional view therethrough, taken approximately in the vertical plane bisecting the truck transversely as indicated by the line 6—6 of Figure 3.

Figure 7 is a sectional view through the jaw of the side frame over the journal box opening approximately in the diagonal plane indicated by the line 7—7 of Figure 4.

Figure 3:
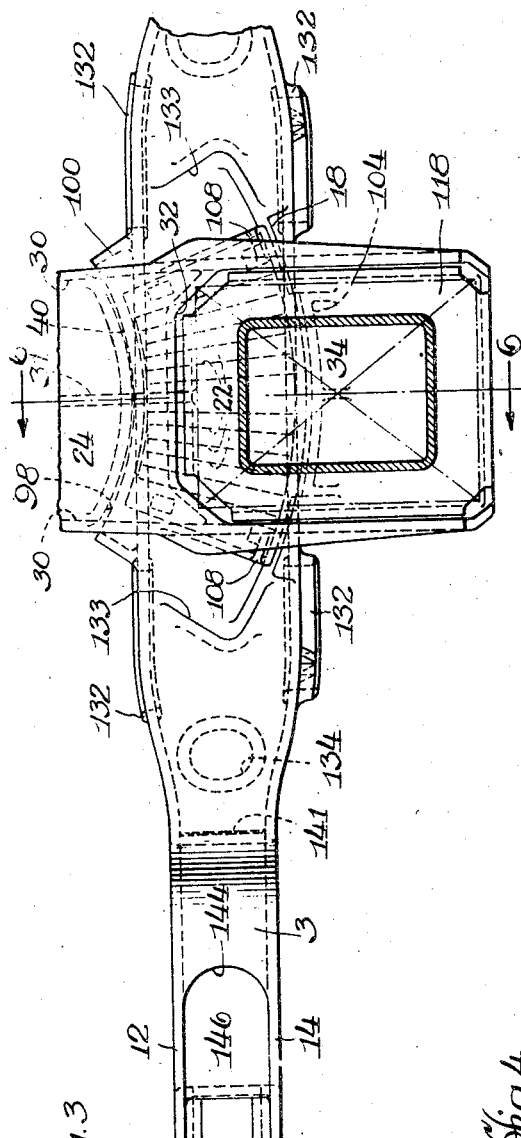
Figure 3 is a fragmentary plan view somewhat enlarged, showing in detail the connecting portions of the side frame and bolster and adjacent parts thereof, including the car body side bearing.

Describing my novel structure in detail and referring first to the general arrangement illustrated in Figures 1 and 2, the truck comprises spaced beam type side frames 2, 2 having jaw ends 3, 3 receiving journal boxes 4, 4 affording usual connecting means to the inboard journal portions of wheel and axle assemblies generally designated 6, 6. Each beam type side frame is of general box section, having the top chord 8 (Figure 6), the bottom chord 10, inboard and outboard webs 12 and 14 with the top chord 8 somewhat widened adjacent the midportion of the frame and formed with upstanding inboard and outboard flanges 16 and 18 defining a seat 20 for a series of rollers 22, 22 upon which may be superposed the truck bolster, generally designated 24.

The bolster 24 may be of box section with the top chord 26, the bottom chord 28, and spaced side walls 30, 30 and a vertical longitudinal center web 31, said top chord being cut away adjacent the ends of the bolster to form spring pockets 32, 32 within which may be carried a composite spring group diagrammatically indicated at 34 (Figures 5 and 6), said spring group being seated upon the bottom chord of the bolster end as at 36.

The bolster 24 may have outboard arcuate bearing guides in engagement with the side frames as at 38, 38 (Figure 1), and arcuate inboard bearing guides engaged therewith as at 40, 40, said guiding arrangement being further referred to in detail hereinafter.

Each side frame 2 may have transversely aligned brake beam guide slots 42, 42 formed in the inboard and outboard walls thereof, said slots being somewhat diagonally arranged to accommodate the normal position of the brake beam with respect to the adjacent wheel. The simple brake arrangement is illustrated in Figures 1 and 2 and comprises the dead truck lever 44 (Figure 1, right) adjustably fulcrumed at one end as at 46 from a link 48 which is pivotally secured as at 50 to the bracket 52 fixed as at 54, 54 on the inboard wall of the side frame adjacent the pedestal jaw. Intermediate its ends the lever 44 may have pivotal connection as at 56 to the fulcrum 58 secured as at 60, 60 to the beam type brake beam 62 whose opposite ends may project through and be guided in the before-mentioned side frame slots 42, 42. Each slot 42 may be lined with wear plates as illustrated at 64, 64, said slots thus serving as support and guiding means for the brake beam. At the opposite ends of the beam 62 may be supported brake heads 66, 66 carrying the usual brake shoes 68, 68 for engagement with the peripheries of the adjacent wheel.

The opposite end of the lever 44 may have pivotal and adjustable connection as at 70 to the jaw end 72 of the compression bar or rod 74, and the opposite jaw end 76 thereof may be pivotally and adjustably connected as at 78 to one end of the live truck lever 80. The live truck lever 80 may have pivotal connection at an intermediate point as at 82 to the fulcrum 84 secured on the brake beam 86, said brake beam 86 extending through guiding and supporting slots in the side frames and carrying at its opposite ends brake heads 88, 88 with associated shoes 90, 90. The opposite end of the live truck lever 80 may have pivotal and adjustable connection as at 92 to the jaw end 94 of the pull rod 96 which may be connected to any convenient actuating means.

Figure 4:
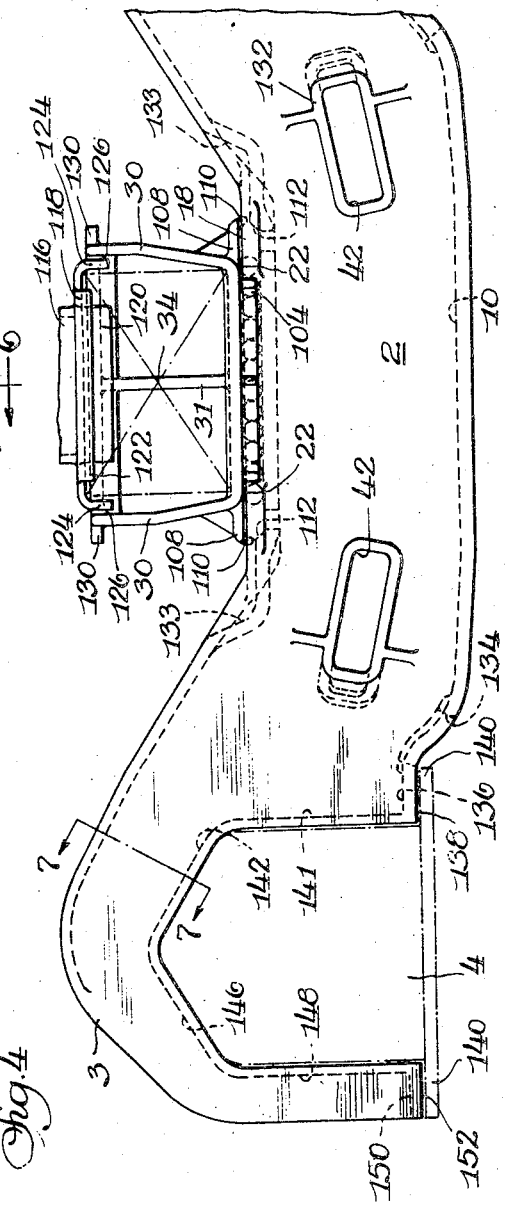
Figure 4 is a side elevation somewhat enlarged, showing in detail the side frame and bolster arrangement and the manner of superposing the car body.

In the detailed views of Figures 3 and 4, the side frame structure is illustrated at only one end since the other end is identical therewith. These views, taken in conjunction with Figures 5 and 6, illustrate more clearly the detail of my novel truck structure. Adjacent each side frame the bottom wall 28 of the bolster is offset slightly as at 98 (Figure 6) to form a shoulder of arcuate form, as may well be seen in the top plan view of Figure 3. Said shoulder may cooperate as at 40 with the adjacent edge of the bracket 100, formed at the upper edge of the inboard wall of the side frame, said bracket 100 also affording a seat as at 102 (Figure 6) for the bolster upon the side frame in case of failure of the supporting rollers 22, 22. The flange 18 defining the outboard edge of the roller seat 20 of each side frame may also be of arcuate form concentric with the inboard guide 40, thus forming an outboard guide between the side frame and the depending complementary flange 104 (Figure 6) formed on the bottom wall of the bolster. The roller seat 106 formed on the bottom of the bolster between the shoulder 98 and the flange 104, may be extended somewhat laterally of the bolster, as well seen in the side view of Figure 4, by the wing portions 108, 108 whose downturned edges at 110, 110 may serve in cooperation with the aligned ledges 112, 112 on the side frame to confine and limit the rollers.

The spring seat pocket 32 at each end of the bolster may confine the spring group 34, as already described, and upon each spring group 34 may be seated the adjacent end of the body bolster forming a portion of the car body in usual manner. The body bolster 114 may have at each end thereof a side bearing 116 at the lower extremity of which may be formed the spring seat 118 bearing as at 119 upon the springs 34 having the downturned inboard flange 120, the downturned outboard flange 122, and downturned lateral flanges 124, 124 which may cooperate as at 126, 126 with the adjacent side walls 30, 30 of the bolster end, limiting longitudinal movement of the car body with respect to the bolster, and the flanges at 120, 120 limiting the lateral movement of the car body with respect to the bolster as by abutment at 128 (Figure 6). The upper edge of each bolster side wall adjacent the abutment 126 may be reinforced by the horizontal flange 130.

As before mentioned, the side frame structure is of box section and the side walls thereof may be reinforced as at 132, 132 by bead-like flanges about the peripheries of the brake beam openings 42, 42 in the spaced side walls thereof. The midportion of the frame is substantially horizontal and straight and the jaw end portions thereof are elevated somewhat with respect thereto. The horizontal portion of the top web 8 of the side frame may be continued beyond the roller seat 20 inboard the flange 108, turning abruptly upward therefrom as at 133 and so accommodate the adjacent wing portion 108 on the bottom of the bolster. Adjacent each journal opening the bottom chord 10 of the side frame may be cored away as at 134 for convenient foundry practice and therebeyond may be formed with the horizontal ledge 136 in close proximity as at 138 to the bottom flange 140 at the bottom of the adjacent journal box 4. The vertical web 141 of the side frame may cooperate with the side wall of the adjacent box and continue thereover in the diagonal web 142, the box section of the side frame at that point having approximately the section illustrated in Figure 7 with the horizontal top web 8, the inboard and outboard walls 12 and 14, and the V-shaped bottom web 142. The bottom web 142 may thus cooperate with the top wall of the journal box of complementary form. The top web 8 of the side frame may terminate as at 144 (Figure 3, left) and the extremity of each jaw may thus be of U-section with the inboard wall 12, the outboard wall 14, and the bottom web 146, said web 146 being continued in the vertical portion 148 at the opposite side of the box and the horizontal web 150 for cooperation as at 152 with the before-mentioned bottom flange 140 of the journal box.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway vehicle, spaced inboard side frames having centrally located concentric roller seats on the compression members thereof, a bolster anti-frictionally supported on said seats for pivotal movement with respect to said frames, spring seats on said bolster outwardly of said frames, a body bolster spring-supported from said spring seats, and spaced wheel and axle assemblies supporting said frames.

2. A center-bearingless bolster for a railway car truck having antifriction roller races thereon for cooperation with antifriction rollers supported on an associated side frame, said bolster having spring pockets at opposite ends thereof for associated car body supporting spring groups, and concentric guide means on the bottom of said bolster for cooperation with complementary guide means on said side frame, the guide means at opposite ends of said bolster being drawn from a common center.

3. A center-bearingless bolster for a railway car truck having antifriction roller races thereon for cooperation with antifriction rollers supported on an associated side frame, said bolster having spring pockets at opposite ends thereof for associated car body supporting spring groups, and concentric guide means on the bottom of said bolster at opposite ends thereof for cooperation with complementary guide means on the top of said side frame.

4. In a railway car truck, spaced side frames, a bolster antifrictionally supported thereon, springs on the ends of said bolster, and a body-bolster supported on said springs, said bolster having lateral and longitudinal stop means at opposite ends thereof cooperating with each side frame and with said body-bolster, said bolster and side frame cooperating stop means being of arcuate form and having a common center.

5. In a railway car truck, spaced side frames, a bolster antifrictionally supported thereon, springs on the ends of said bolster, and a car body-bolster supported on said springs, said bolster having integral lateral and longitudinal stop means at opposite ends thereof cooperating with each side frame and with said body bolster, said bolster and side frame cooperating stop means being of arcuate form.

6. In a railway car truck, spaced wheel supported side frames, a bolster antifrictionally supported on each frame, and concentric inboard and outboard guides on each side frame engaging complementary guides on said bolster, all of said hinges being drawn from a common center, and a resilient unit on said bolster adjacent each end thereof for support of an associated car body.

7. A center bearingless bolster for a railway vehicle, said bolster having spaced concentric roller races on the bottom thereof and associated concentric guide means for cooperation with spaced supporting side frames, spring pockets at the ends of said bolster outwardly of said races for associated body bolster supporting springs, and guide means on said pockets for said body bolster.

8. A center bearingless bolster for a railway vehicle, said bolster having spaced concentric roller races on the bottom thereof and associated concentric guide means for cooperation with spaced supporting side frames, spring pockets at the ends of said bolster outwardly of said races for associated body bolster supporting springs, and stop means on said pockets for limiting relative lateral and rotational movements of an associated body bolster with respect to said first-mentioned bolster.

9. In a railway car truck, spaced inboard side frames, supporting wheel and axle assemblies, rollers on said frames, a bolster supported on said rollers, a body-bolster spring supported on said bolster, and concentric inboard and outboard guide means on said bolster for each side frame.

10. In a railway vehicle, spaced box-section side frames, a roller seat on each of said frames, a box-section bolster antifrictionally supported on said seats, spaced wheel and axle assemblies supporting said frames, spring seats on said bolster outboard said roller seats, and a body bolster spring-supported from said last-mentioned seats.

11. In a railway car truck, spaced wheel supported side frames, a bolster antifrictionally supported on each frame, concentric inboard and outboard guides on each side frame engaging complementary guides on said bolster, and a resilient unit on said bolster adjacent each end thereof for support of an associated car body.

12. In a railway car truck, a box-section truck bolster having top and bottom walls and spaced side walls extending therebetween, spring pockets in said bolster at opposite ends thereof, springs in said pockets, and a body bolster having horizontal spring seats at opposite ends thereof seated on said springs and downturned flanges on angularly related edges of said seats cooperating with the top and side walls of said truck bolster for limiting lateral and longitudinal movement of said body bolster relative to said truck bolster.

13. In a railway vehicle, spaced box-section side frames, a roller seat on each of said frames, a box-section bolster antifrictionally supported on said seats, spaced wheel and axle assemblies supporting said frames, spring seats on said bolster outboard said roller seats, a body bolster spring-supported from said last-mentioned seats, and angularly related cooperating stop means on said bolsters.

14. A box-section truck bolster having a compression member extending from end to end thereof and a tension member terminating short of said ends, roller races on said compression member adjacent the ends of said tension member for cooperation with a supporting side frame, and seats at the extremities of said compression member for car body supporting springs.

15. In a railway vehicle, spaced inboard side frames, supporting wheel and axle assemblies, roller seats on said frames intermediate said wheels, a truck bolster antifrictionally supported thereon, spring seats on said bolster outwardly of said frames, and a body bolster spring-supported from said last-mentioned seats.

16. In a railway vehicle, spaced inboard side frames, supporting wheel and axle assemblies, roller seats on said frames intermediate said wheels, a truck bolster antifrictionally supported thereon, spring seats on said bolster outwardly of said frames, a body bolster spring-supported from said last-mentioned seats, and angularly related stop means on each end of said truck bolster cooperating with said body bolster.

17. In a railway vehicle, spaced inboard side frames, supporting wheel and axle assemblies, roller seats on said frames intermediate said wheels, a truck bolster antifrictionally supported thereon, spring seats on said bolster outwardly of said frames, and a body bolster spring-supported from said last-mentioned seats, each of said side frames having diagonally arranged slots adjacent respective wheels for support of an associated brake beam.

18. In a railway vehicle, spaced side frames, supporting wheel and axle assemblies, a bolster antifrictionally supported on said frames inboard said wheels, spring seats at the extremities of said bolster in line with the wheels at respective sides of the truck, springs on said seats, and a car body member supported from said springs.

19. In a railway vehicle, spaced side frames, supporting wheel and axle assemblies, a bolster antifrictionally supported on said frames inboard said wheels, concentric inboard and outboard guides on each side frame engaging complementary guides on said bolster, spring seats at the extremities of said bolster in line with the wheels at respective sides of the truck, springs on said seats, and a car body member supported from said springs.

20. In a railway vehicle, spaced inboard side frames, supporting wheel and axle assemblies, a truck bolster antifrictionally supported on said frames, spring seats on said truck bolster in line with said wheels, and a car body member spring-supported from said seats.

21. In a railway car truck, spaced side frames, supporting wheel and axle assemblies, rollers on said frames, a bolster supported on said rollers, said bolster having spring pockets at opposite ends thereof for associated car body supporting spring groups, and concentric inboard and outboard guide means on said bolster for each side frame.

22. In a railway car truck, spaced side frames, supporting wheel and axle assemblies, rollers on said frames, a bolster supported on said rollers, springs on the ends of said bolster, a car body-bolster supported on said springs, concentric inboard and outboard guide means on said bolster for each side frame, and lateral and longitudinal stop means on said bolster cooperating with each side frame and with said body-bolster.

23. In a railway vehicle, spaced inboard side frames, supporting wheel and axle assemblies, a truck bolster antifrictionally supported on said frames, concentric inboard and outboard guides on each frame engaging complementary guides on said bolster, spring seats on said truck bolster in line with said wheels, a car body member spring-supported from said seats, and angularly-related cooperating stop means on said body member and said bolster.

24. In a railway vehicle, spaced inboard side frames, supporting wheel and axle assemblies, a truck bolster antifrictionally supported on said frames, spring seats on said truck bolster in line with said wheels, a car body member spring-supported from said seats, and cooperating lateral motion stop means on said body member and said bolster adjacent said seats.

25. In a railway car truck, a truck structure comprising spaced side frames each being of box section having a top chord with a horizontal midportion providing an arcuate roller seat, a truck bolster antifrictionally supported on said seats, a body bolster spring-supported on said truck bolster outwardly of said frames, and spaced supporting wheel and axle assemblies for said frames.

26. In a railway car truck, a truck structure comprising spaced side frames each being of box section having a top chord with a horizontal midportion providing an arcuate roller seat, a truck bolster antifrictionally supported on said seats, spring seats on said bolster outboard said roller seats, and a body bolster spring-supported from said last-mentioned seats.

27. A box-section truck bolster having a compression member extending from end to end thereof and a tension member terminating short of said ends, roller races on said compression member adjacent the ends of said tension member for cooperation with a supporting side frame, seats at the extremities of said compression member for car body supporting springs, and angularly arranged stop means at each end of said box-section bolster adjacent said spring seats for cooperation with a body bolster associated with said car body.

BERTRAM J. MILLEVILLE.

REFERENCES CITED

The following references are of record in the file of this patent:

UNITED STATES PATENTS

| Number | Name | Date |
|---|---|---|
| 1,198,999 | Dunaway | Sept. 19, 1916 |
| 1,092,814 | Kellogg | Apr. 7, 1914 |
| 1,346,765 | Porter | July 13, 1920 |
| 711,899 | Johnson et al. | Oct. 21, 1902 |
| 1,092,814 | Kellogg | Apr. 7, 1914 |
| 1,275,340 | Westlake | Aug. 13, 1918 |
| 1,194,349 | Barber | Aug. 15, 1916 |
| 1,678,322 | Blunt | July 24, 1928 |
| 309,657 | Shedlock | Dec. 23, 1884 |
| 972,286 | Summers | Oct. 11, 1910 |
| 1,405,619 | O'Connor | Feb. 7, 1922 |
| 2,011,190 | Barrows | Aug. 13, 1935 |
| 1,168,604 | Chandler | Jan. 18, 1916 |
| 1,772,328 | Symington et al. | Aug. 5, 1930 |
| 418,028 | Jewett | Dec. 24, 1889 |
| 1,871,621 | Latshaw | Aug. 16, 1932 |

FOREIGN PATENTS

| Number | Country | Date |
|---|---|---|
| 48,164 | French | July 20, 1937 |
| 1st addition to Patent 793,220 | | |